F. W. MEAD & T. W. DEAKIN.
SIDE CAR FOR USE WITH MOTOR CYCLES AND THE LIKE.
APPLICATION FILED SEPT. 20, 1912.

1,174,333.                               Patented Mar. 7, 1916.

Witnesses:                               Inventors:

UNITED STATES PATENT OFFICE.

FREDERICK WILLIAM MEAD AND THOMAS WILLIAM DEAKIN, OF BIRMINGHAM, ENGLAND.

SIDE CAR FOR USE WITH MOTOR-CYCLES AND THE LIKE.

1,174,333. Specification of Letters Patent. Patented Mar. 7, 1916.

Application filed September 20, 1912. Serial No. 721,465.

*To all whom it may concern:*

Be it known that we, FREDERICK WILLIAM MEAD and THOMAS WILLIAM DEAKIN, subjects of the King of Great Britain, residing at Birmingham, in the county of Warwick, England, have invented certain new and useful Improvements in Side Cars for Use with Motor-Cycles and the like, of which the following is a specification.

This invention relates to sidecars for use with motor cycles and the like, and has for its object to provide an improved type of frame of the same providing a very low body position and a rigid and strong connection in spite of its small weight.

Longitudinal frame members are used which are arranged low and lie underneath the body and curve upward behind the body.

According to this invention, the frame is attached at the upwardly projecting rear part to the cycle frame and also at the low front. Thus the body can be arranged extremely low, but ample support is provided owing to the attachment of the cycle frame being arranged high up and as low down as possible. There may also be the usual attachment near the axle of the sidecar.

If desired the upwardly projecting rear frame members may be attached to a frame cross member which is itself attached to the cycle frame.

Where necessary the upper cross member may be extended over the wheel to form a bridge and be connected by a strut to the outer end of the sidecar axle so that the frame is supported on both sides of the wheel at the top. The strut may be easily detachable.

Figure 2:
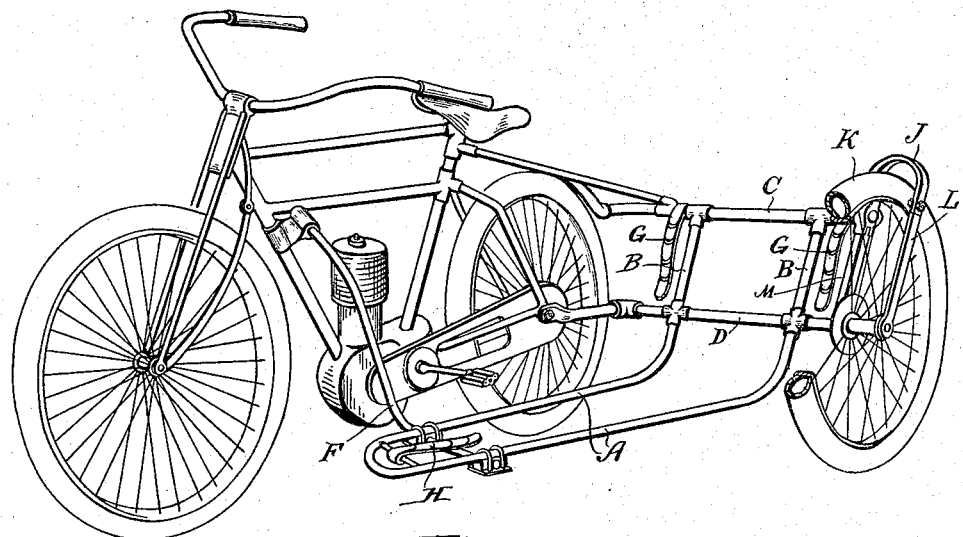
Figure 1:
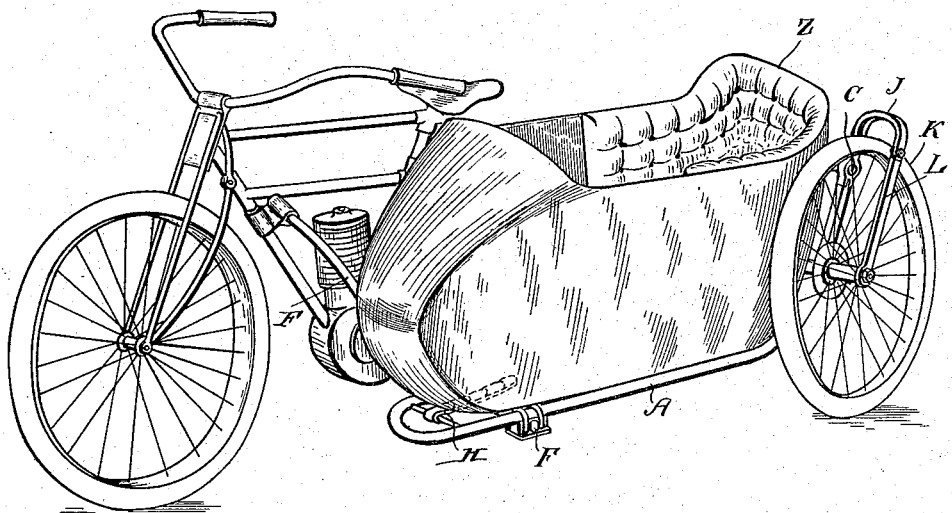

In the construction shown in the accompanying drawings, Figure 1 is a perspective view showing the sidecar attached to a motor-cycle, and Fig. 2 is a similar view showing the body of the sidecar removed to better show the supporting framework therefor.

Like letters indicate like parts throughout the drawings.

The longitudinal frame members consist of a single tube A bent around at the front end so as to form two approximately parallel members. These members are arranged horizontally in front curving upward at the back as at B to a point about level with the top of the sidecar wheel. At this point they are secured to the cross member C which may be adjustably connected to the cycle frame.

The fixed axle D is attached to the longitudinal members and is detachably connected at E to the cycle frame in the ordinary manner. The front end of the frame rests upon, or is otherwise attached to, an arm F which projects upward and is attached to the cycle near the steering head as usual. Thus a very rigid construction is provided which allows the body Z to be arranged extremely low. The body may be suspended from the upper cross member C by either spiral, helical, or leaf springs, leaf springs G being shown, and preferably a leaf spring H is arranged between the front of the body and the front of the frame.

If desired, the upper cross member C may have detachably connected to it a bridge J which spans the wheel K and is connected to the fixed wheel spindle by a strut L which may be easily removable to permit of access to the wheel. This arrangement provides a very stiff construction. There may also be an additional strut arranged at M.

What we claim as our invention and desire to secure by Letters Patent is:—

1. In combination, a body, a single frame tube lying beneath the body and bent to form two approximately parallel tube members and two tube members projecting upwardly at an angle to the others, an axle upon which the various tube members are carried, a wheel mounted on said axles, and means carried by the frame tube to adapt the latter to be attached to a bicycle.

2. In combination, a body, horizontal frame tubes lying beneath said body, upwardly projecting frame tubes at the rear of said body, an axle upon which the various tubes are carried, a wheel mounted on said axle, leaf spring connections between said body and said horizontal and upwardly projecting tube members, and means carried by the various tubes to adapt the latter to be attached to a bicycle.

3. In combination, a body, a supporting framework for said body comprising a single tube bent to form two horizontal members lying beneath the body and two upwardly projecting members at the rear of the body, an axle upon which the various tube members are carried, and a wheel mounted on the axle, and means carried by the framework to adapt the latter to be attached to a bicycle.

4. In combination, a body, a supporting framework for said body comprising a single tube bent to form two horizontal members lying beneath said body and two upwardly projecting members at the rear of the body, a cross member to which the upper ends of the said upwardly projecting members are secured, an axle carrying the various tube members, and a wheel mounted on said axle, and means carried by the framework to adapt the latter to be attached to a bicycle.

In testimony whereof we have signed our names to this specification in the presence of two subscribing witnesses.

FREDERICK WILLIAM MEAD.
THOMAS WILLIAM DEAKIN.

Witnesses:
S. N. BENSON,
K. M. THOMPSON.

Copies of this patent may be obtained for five cents each, by addressing the "Commissioner of Patents, Washington, D. C."